United States Patent
Kreher

(10) Patent No.: US 10,945,918 B2
(45) Date of Patent: Mar. 16, 2021

(54) METHOD AND APPARATUS FOR PRODUCING PRIMARY PACKAGING HAVING AN INTEGRATED SEPTUM AND PRIMARY PACKAGING HAVING AN INTEGRATED SEPTUM

(71) Applicant: Gerresheimer Regensburg GmbH, Regensburg (DE)

(72) Inventor: Jessica Kreher, Schwandorf (DE)

(73) Assignee: Gerresheimer Regensburg GmbH, Regensburg (DE)

( * ) Notice: Subject to any disclaimer, the term of this patent is extended or adjusted under 35 U.S.C. 154(b) by 129 days.

(21) Appl. No.: 16/109,305

(22) Filed: Aug. 22, 2018

(65) Prior Publication Data

US 2019/0060167 A1     Feb. 28, 2019

(30) Foreign Application Priority Data

Aug. 23, 2017  (EP) ..................................... 17187425

(51) Int. Cl.
*B29C 45/14* (2006.01)
*A61J 1/14* (2006.01)
(Continued)

(52) U.S. Cl.
CPC ....... *A61J 1/1406* (2013.01); *B29C 45/14065* (2013.01); *B29C 45/14262* (2013.01);
(Continued)

(58) Field of Classification Search
CPC ............ B29C 45/14262; B29C 45/261; B29C 45/14778; B29C 45/14336; B29C 45/14065; A61J 1/1481; A61J 1/1406
(Continued)

(56) References Cited

U.S. PATENT DOCUMENTS

2008/0102235 A1 * 5/2008 Skigen ................ B29C 45/1675
428/35.7
2016/0121526 A9     5/2016 Harding et al.

FOREIGN PATENT DOCUMENTS

DE      102013113399      6/2015
WO      2011/089193       7/2011

OTHER PUBLICATIONS

Translation of DE 102013113399A1 (Year: 2015).*
(Continued)

*Primary Examiner* — King M Chu
(74) *Attorney, Agent, or Firm* — Leydig, Volt & Mayer, Ltd.

(57) ABSTRACT

The invention relates to a method for producing primary packaging having an integrated septum characterised by: a) providing a septum, b) providing an injection-molding die having two die halves, c) positioning the septum in the injection-molding die, d) moving the two die halves of the injection-molding die to form a cavity corresponding to the shape of the primary packaging to be produced, e) injecting a material into the cavity via an injection opening, where the two die halves of the injection-molding die pretensioningly holding the septum, and a rim of the septum is overmolded by the material, f) cooling the injected material while maintaining a holding pressure, g) moving the two die halves of the injection-molding die such that the produced primary packaging means having the integrated septum can be removed from the injection-molding die, and h) removing the produced primary packaging having the integrated septum from the injection-molding die.

8 Claims, 10 Drawing Sheets

(51) Int. Cl.
　　　*B29C 45/26*　　　(2006.01)
　　　*B29L 31/00*　　　(2006.01)
　　　*B29K 621/00*　　(2006.01)
　　　*B29C 45/37*　　　(2006.01)
　　　*A61J 1/06*　　　　(2006.01)

(52) U.S. Cl.
　　　CPC .. B29C 45/14336 (2013.01); B29C 45/14778 (2013.01); B29C 45/261 (2013.01); *A61J 1/062* (2013.01); *A61J 1/1481* (2015.05); *B29C 45/37* (2013.01); *B29C 2045/14122* (2013.01); *B29C 2045/14278* (2013.01); *B29K 2621/00* (2013.01); *B29L 2031/712* (2013.01)

(58) Field of Classification Search
　　　USPC ........................................................ 206/364
　　　See application file for complete search history.

(56) References Cited

OTHER PUBLICATIONS

European Search Report, dated Feb. 1, 2018, corresponding to European Application No. EP 17187425.8, a related application, 4 pp. (in German language).
European Office Action, dated Oct. 2, 2020, corresponding to European Application No. EP 17187425.8, 4 pp.

\* cited by examiner

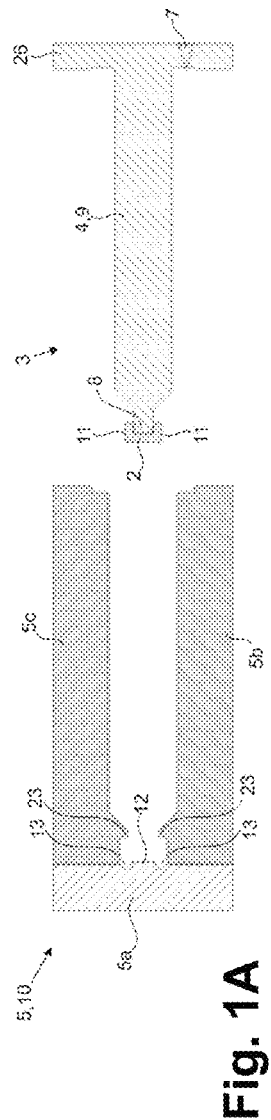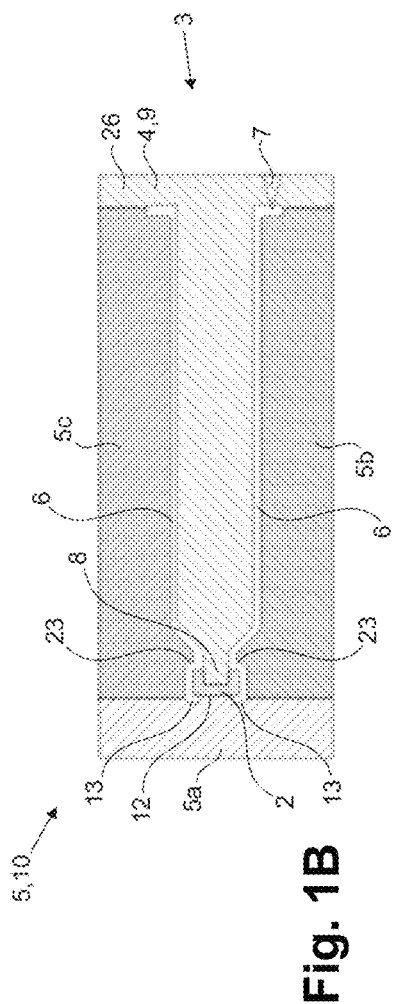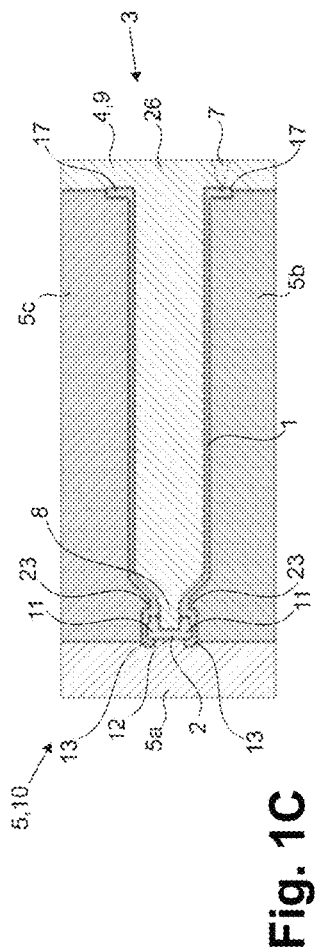

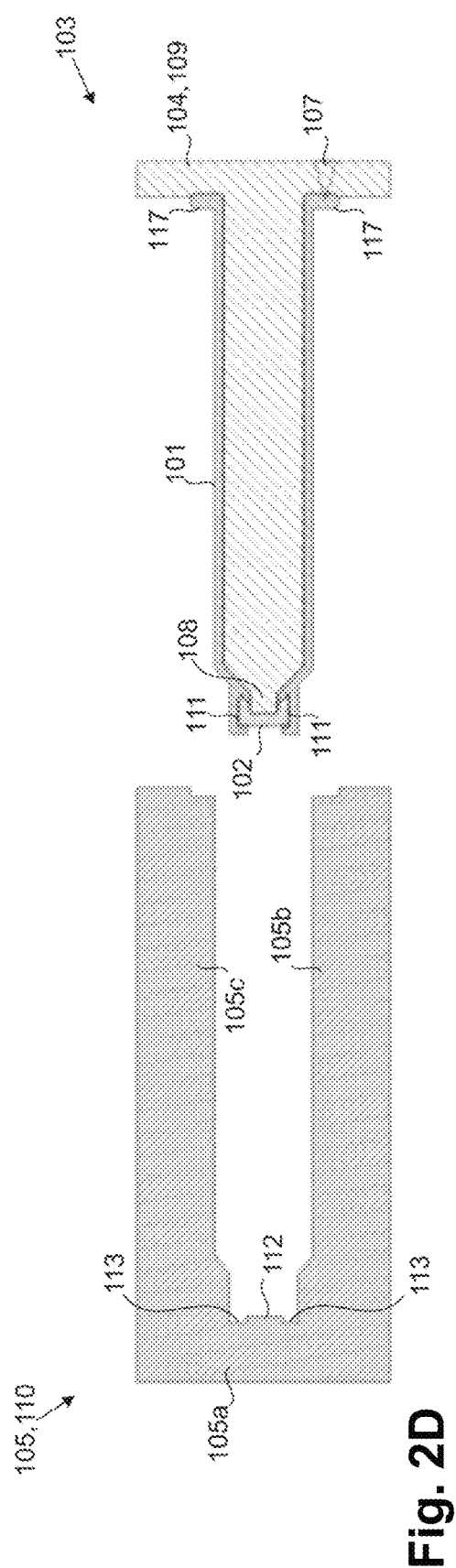
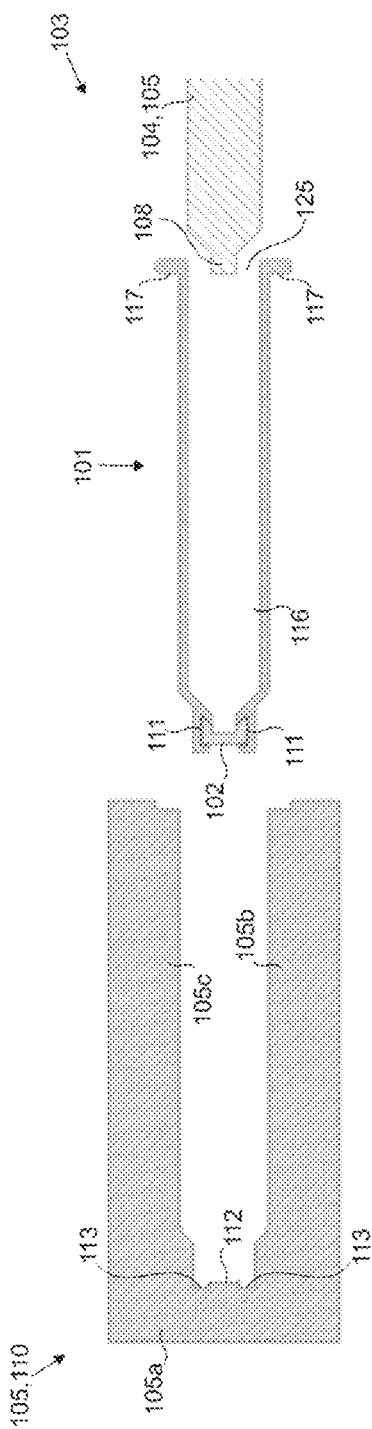
Fig. 2D
Fig. 2E

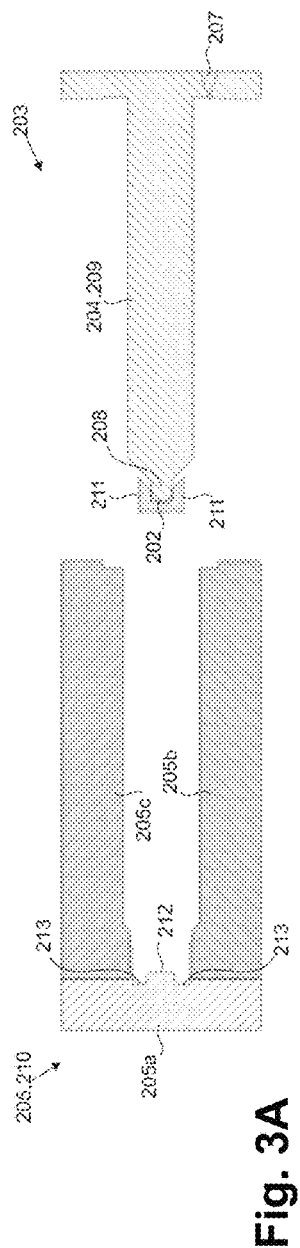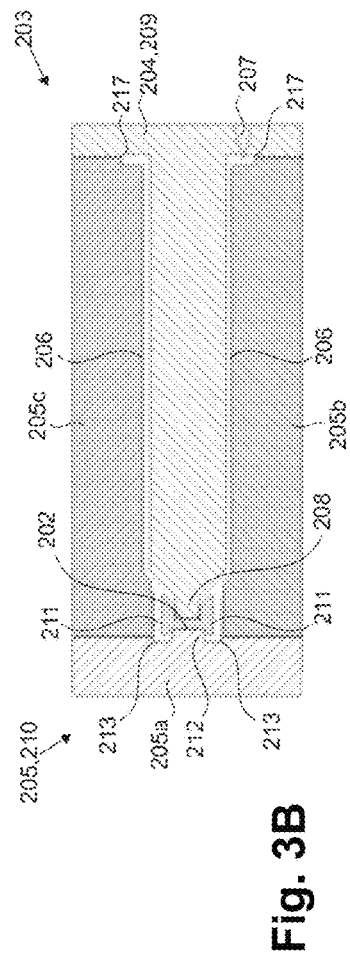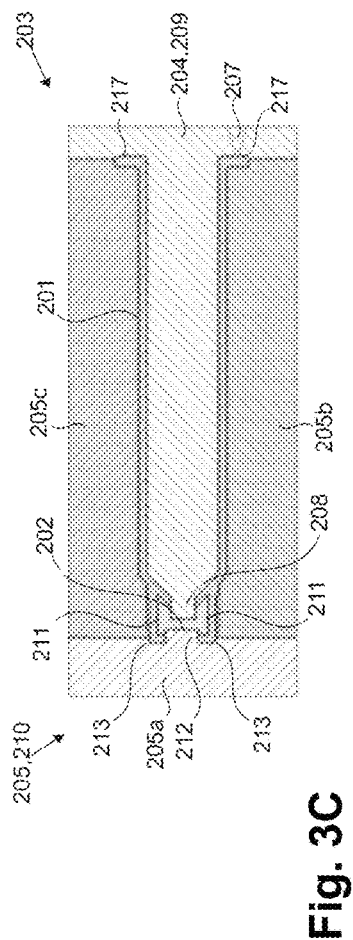

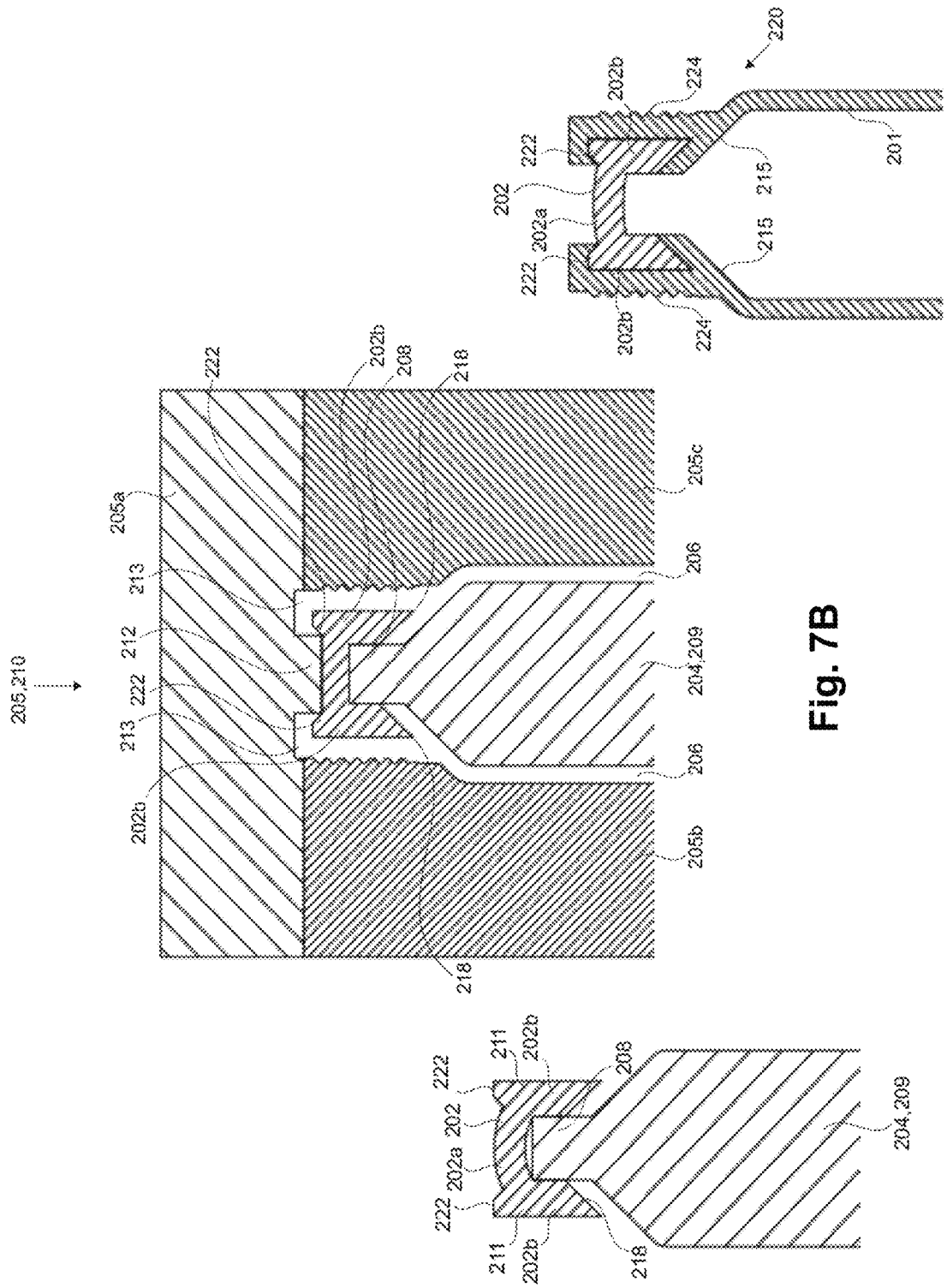

METHOD AND APPARATUS FOR PRODUCING PRIMARY PACKAGING HAVING AN INTEGRATED SEPTUM AND PRIMARY PACKAGING HAVING AN INTEGRATED SEPTUM

CROSS-REFERENCE TO RELATED APPLICATIONS

This application is a U.S. nonprovisional application filed under 35 U.S.C. § 111(a) which claims the benefit of European Application No. 17187425.8, filed on Aug. 23, 2017. This application is hereby incorporated by reference in its entirety.

BACKGROUND OF INVENTION

The invention relates to a method and to an apparatus for producing primary packaging having an integrated septum, and to primary packaging having an integrated septum.

In the pharmaceutical industry, liquid pharmaceuticals or similar liquids are often filled into primary packaging having an integrated septum in a sterile manner, from which packaging appropriate doses can be administered, for example by means of auto-injectors or injection pumps. To ensure the sterility of the pharmaceutical, primary packaging of this kind generally comprises a septum that can be pierced by means of an injection needle. It is thus possible for sterile pharmaceuticals to be drawn from the primary packaging into an injection apparatus by means of the injection needle and to be administered to a patient. As soon as the required amount or dose has been removed, the injection needle is then withdrawn from the septum again. The septum here seals the primary packaging, together with the sterile pharmaceutical stored therein, again in a sterile manner. For this purpose, the septum has a certain internal compression, which helps the sterile pharmaceutical in the primary packaging remain sterile with respect to the surroundings.

Currently, primary packaging of this kind made of glass is generally known, however, it is relatively prone to breakage. Furthermore, the high tolerances associated with glass production lead not only to higher production costs as a result of the amount of scrap material that follows, but also to additional requirements when developing the design for compatible devices into which said primary packaging is intended to be inserted or integrated. Compatible devices of this kind are auto-injectors and also infusion pumps, for example.

In the case of primary packaging of this kind made of glass, the septum is also attached to the primary packaging in an additional working or assembly step, thus sealing the smaller opening in the primary packaging. In the process, the septum is mounted above said smaller, upper opening in the primary packaging by means of a crimped support, for example made of aluminium.

Although individual units of primary packaging made of plastics material are also known, they are not compatible with standard filling systems. The costs for planning and developing individual filling systems may be many times greater than the costs for a standard multi-filling system and can easily reach tens of millions of euros. The lead times for individual systems of this kind are also considerably longer than for standard filling systems.

Furthermore, when primary packaging of this kind having an integrated septum is produced, the septum has to have a certain pretension or compression in the primary packaging in order to ensure the necessary tightness and minimise the risk, when piercing the septum, of cutting out particles that will then enter the flow path.

On account of its susceptibility to breakage, primary packaging that has an integrated septum and is formed as glass cartridges so far have to be mounted and positioned in auto-injectors, such as insulin pens or the like, such that said packaging is adequately protected from external impact if the device is unintentionally dropped and crashes to the floor, for example.

While it is possible to cure primary packaging made of glass by means of chemical processes in order to achieve greater breakage resistance, these curing processes are prone to failure and technically complex to implement, and yet there is still a moderate risk that the primary packaging will break.

The high tolerances associated with glass production or the fluctuations in the dimensions when producing the primary packaging from glass lead not only to higher production costs, for example as a result of sorting dimensionally acceptable primary packaging, but also to challenges when developing designs for compatible devices into which said packaging is later intended to be inserted. Ensuring robust interface compatibility with the (auto-)injectors or pumps, which are typically made of plastics material, and the associated lower tolerances leads to additional development requirements and also higher production and development costs that are thus incurred.

The object of the invention is therefore to provide a method and an apparatus for producing primary packaging having an integrated septum and primary packaging of this kind, said primary packaging being resistant to breakage, the process for producing it being simple and having a narrow tolerance range, and it also being possible to use said packaging in conventional standard filling systems.

This object is achieved by a method, an apparatus, and primary packaging having all the features of the present claims. Advantageous embodiments of the invention can further be found in the dependent claims.

The method according to the invention for producing primary packaging having an integrated septum is characterised by the following method steps:

a) providing a septum, b) providing an injection-molding die having two die halves that can be moved relative to one another, it being possible either for the two die halves to be movable, or for the one die half to be stationary and the other die half to be movable, c) positioning the septum in the injection-molding die, d) moving the two die halves of the injection-molding die such that a cavity is formed that corresponds to the shape of the primary packaging to be produced, e) injecting a material into the cavity in the injection-molding die via an injection opening in one of the die halves of the injection-molding die, the two die halves of the injection-molding die pretensioningly holding the septum therebetween, and a rim of the septum being overmolded by the material, a region of the septum in contact with the two die halves remaining free of material, f) cooling the injected material while maintaining a holding pressure, as a result of which the primary packaging is formed having an integrated septum, g) moving the two die halves of the injection-molding die such that the produced primary packaging having the integrated septum can be removed from the injection-molding die, and h) removing the produced primary packaging having the integrated septum from the injection-molding die.

The method according to the invention now makes it possible, using an injection-molding method, to produce primary packaging that has an integrated septum, is made of plastics material and is therefore far more resistant to breakage than any primary packaging made of glass. Furthermore, an injection-molding method of this kind ensures that the primary packaging having the integrated septum can be produced in a manner involving low tolerances and it is thus possible to achieve greater interface compatibility with the devices, generally made of plastics material, into which said packaging is intended to be inserted, such as (auto-) injectors or injection pumps or the like. The production of the primary packaging in a manner involving considerably lower tolerances also allows a lower amount of scrap and a larger degree of freedom when designing the primary packaging. Not only does this minimise production costs, considerably less material is also needed for production since a considerably lower amount of scrap, or even none at all, is produced as a result of the low tolerance.

Within the scope of the invention, a septum that is produced in an assembly injection molding process can be used to produce the primary packaging. A septum is understood to refer here to any possible elastomer insert, and therefore septa made of an elastomer may also be used. Before the septum is attached to the primary packaging, it is no longer necessary according to the invention to provide the septum with a crimped support. Rather, the septum is fixed in the primary packaging during the injection-molding process without a separate support, while being subject to the necessary pretension.

The compression of the septum during the production of the primary packaging is generated between the two moved die halves; as a result, not only is sufficient tightness produced both during the injection-molding process and for the primary packaging thereafter, but the tightness simultaneously reduces the risk of the septum becoming warped when the material or the melt is injected.

According to a first advantageous embodiment of the invention, a plastics material, such as a cycloolefin polymer, a cycloolefin copolymer or the like, is used as the material. Plastics materials of this kind are tried and tested in medical technology and thus ensure the product properties and reliability that are needed to store pharmaceuticals.

According to a further concept of the invention, it has been shown to be advantageous for the septum to be positioned in a holder of a die half designed as a male mold, before the material is injected. This makes it possible to place the septum on the holder of the male mold and ensure the compression of the septum between the two die halves. As a result, the above-mentioned tightness is ensured both during the production process and for the finished primary packaging thereafter.

Alternatively, it is, of course, also possible for the septum to be positioned in a holder of a die half designed as a female mold, before the material is injected. In this procedure, the necessary tightness of the septum is also ensured both during the production of the primary packaging and for the finished primary packaging thereafter.

Furthermore, it has also been shown to be advantageous for a peripheral rim of the septum to be overmolded when the material is injected. This ensures that the septum can be attached to the finished primary packaging and is captively fixed thereto in this position. After the finished primary packaging having the integrated septum has been removed from the injection-molding die, it can be used immediately for further use. In this regard, produced primary packaging having an integrated septum can be immediately inserted into a corresponding apparatus such that immediate sterilisation is subsequently possible. An additional washing or cleaning process is thus no longer necessary for the produced primary packaging.

It is also advantageous for the primary packaging to be produced having a shape which is compatible with standard filling systems and which is thus based on the existing glass cartridges. The primary packaging is subsequently filled with the relevant pharmaceutical and has the same flow properties for the pharmaceutical filled therein as the conventional glass cartridges, on account of the shape corresponding to that of the glass cartridges from the prior art.

Advantageously, after the material has been injected into the cavity, a holding pressure or the injection pressure is maintained at least until the material of the primary packaging has fallen below its solidification temperature such that the septum cannot become detached from the primary packaging or the position of said septum therein cannot be changed.

The apparatus according to the invention for producing primary packaging having an integrated septum is designed as an injection-molding die having two die halves that can be moved relative to one another, it being possible either for the two die halves to be movable, or for the one die half to be stationary and the other die half to be movable. Advantageously, one die half is designed as a male mold, which can be inserted into the other die half designed as a female mold. In this case, one die half comprises a holder for the septum, and the other comprises a stamp. The stamp and the holder are pressed against one another when the material is injected via an injection opening such that, when overmolded, the septum is in a pressed-in, pretensioned state in the apparatus according to the invention. When the material is injected, no material is introduced in the region in which the stamp and the holder of the two die halves press against one another, and said region therefore remains free of material and is later used to remove the pharmaceutical held in the primary packaging.

So that the septum is securely and captively arranged within the primary packaging to be produced, a peripheral channel is advantageously provided in the die half designed as a female mold, next to the stamp. This makes it possible for the septum to be also overmolded with material from the front thereof and for only the region of the septum in which the stamp and the holder press against one another to remain free of material. In this region, the septum can later be pierced by an injection needle such that a pharmaceutical held in the produced primary packaging can be removed from a receiving region thereof.

If the primary packaging to be produced is intended to be provided with a shoulder or a thread or the like in the removal region of said packaging, in which the septum is arranged, the die half designed as a female mold comprises a base and two legs that are positioned substantially perpendicularly thereon, the inner contour of the two legs corresponding to the outer contour of the primary packaging to be produced, and it being possible to move the legs radially outwardly away from the base. This measure makes it possible to use the method according to the invention to produce primary packaging that has shoulders, threads or the like on the outer contour thereof. After the material has been injected into the cavity and has cured, the two legs of the die half designed as a female mold are therefore first moved radially outwardly relative to the base of said die half such that the outer contour of the produced primary packaging is free and the die half designed as a male mold, together with the produced primary packaging, can be withdrawn from the female mold in order to then remove the primary packaging from the male mold by means of a corresponding removal apparatus. Alternatively, it is, of course, also possible to move the die half designed as a female mold away from the male mold and to then remove the primary packaging from the other die half designed as a male mold by means of the removal device and to use said primary packaging for further use.

According to another concept of the invention, the outer contour of the die half designed as a male mold corresponds to the inner contour of the primary packaging to be produced.

The primary packaging according to the invention advantageously consists of a plastics material, in which the septum is accommodated in a removal region, the septum separating a pharmaceutical receiving chamber of the primary packaging from the outside thereof.

In order to produce plastics primary packaging which geometrically corresponds to those made of glass, to which consumers are accustomed and which therefore does not lead to customer acceptance problems on account of a modified design, the removal region comprises a shoulder that faces the receiving chamber.

The same is intended by the embodiment of the invention in which the primary packaging is provided with a peripheral slope at the ends of the pharmaceutical receiving chamber that face the removal region. As a result, the primary packaging tapers towards the removal region in keeping with the conventional primary packaging made of glass, and customer or consumer base acceptance problems therefore should not arise either.

So that, when the primary packaging is produced, the septum can be easily introduced into the die to be used, the septum comprises a base and a peripheral wall region that is positioned substantially perpendicularly thereon. By means of said wall region, the septum can be easily mounted on a corresponding stamp of one die half of the die.

So that said septum can be easily mounted on the stamp without great difficulty, the peripheral wall region of the septum has an inward-facing slope at the free end of said wall region. Said slope is used as a lead-in slope to mount the septum on the stamp.

In one particular embodiment of the invention, said slope may extend as far as the outer wall of the peripheral wall region. This embodiment of the primary packaging according to the invention ensures that, when the primary packaging is produced, wall thicknesses on the neck or the removal region of the primary packaging are avoided such that the flow properties of the liquids held in the primary packaging remain substantially unchanged in comparison with the conventional glass cartridges.

So that the septa can be easily isolated when the primary packaging according to the invention is produced, the septum is provided with spacers on the base thereof. This ensures that, when the septa are supplied to the apparatus according to the invention for producing the primary packaging by means of a production method according to the invention, the septa can be easily and reliably isolated and thus reliably placed on the particular stamp of the corresponding die half.

So that the septum is held on the primary packaging in a considerably improved manner, the septum is provided with a peripheral, preferably chamfered projection on the base thereof. This ensures that, when the primary packaging is produced, the projection on the septum in this region undergoes a kind of back-molding, and the septum is therefore better and more securely fixed on the primary packaging. This advantageously also makes it possible for the tension or compression or grouting of the septum to be better preserved in the finished primary packaging.

It is also advantageous for an opening to be provided on the opposite end of the primary packaging, via which opening a pharmaceutical can be introduced into said primary packaging when it is further processed.

In this case, a flange is advantageously provided on the opening arranged opposite the septum. The additional flange shape opens up additional, alternative options for mounting the primary packaging in the device, greater interface compatibility, and greater degrees of design freedom for the administering device, without reducing the compatibility with the existing standard filling systems.

The internal shape of the primary packaging according to the invention corresponds to that of standard glass cartridges, so that the flow rates for liquid removal or delivery are comparable with and substantially unchanged in relation to those of existing glass cartridges. This is also very important for the market acceptance of the product.

Further aims, advantages, features and potential applications of the present invention can be found in the following description of embodiments with reference to the drawings. All the features that are described or shown in the drawings form the subject matter of the present invention, either in isolation or in any useful combination, irrespective of the grouping of these features in the claims or the dependency references therein.

BRIEF DESCRIPTION OF THE DRAWINGS

In the drawings:

FIGS. 1A to 1F show a first embodiment of a method according to the invention for producing primary packaging according to the invention in a first embodiment of an apparatus according to the invention in several method steps, FIGS. 2A to 2E show a second embodiment of a method according to the invention for producing primary packaging according to the invention in a second embodiment of an apparatus according to the invention in several method steps, FIGS. 3A to 3F show a third embodiment of a method according to the invention for producing primary packaging according to the invention in a third embodiment of an apparatus according to the invention in several method steps, FIGS. 7A to 7C are detailed views of the production of the primary packaging from FIG. 6.

DETAILED DESCRIPTION OF THE INVENTION

Figure 1D:
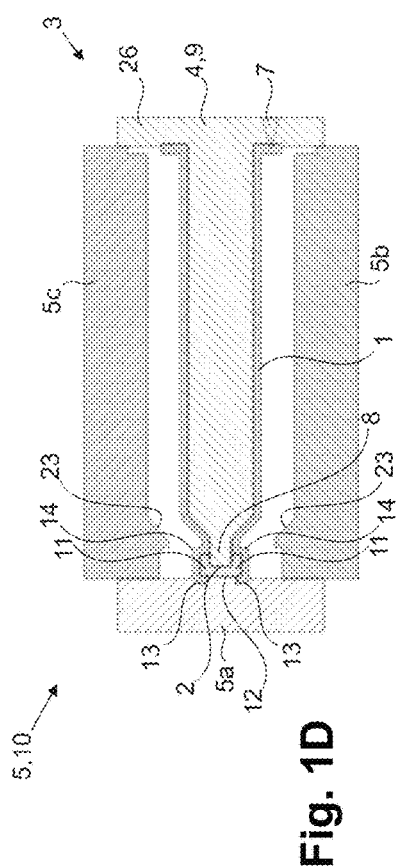

FIG. 1A to 1F show a first embodiment of a method according to the invention for producing primary packaging 1 according to the invention in a first embodiment of an apparatus according to the invention in several method steps.

FIG. 1A shows two die halves 4, 5 of an injection-molding die 3, one die half 4 being designed as a male mold 9 and the other die half 5 being designed as a female mold 10. The die half 4 designed as a male mold 9 is tapered or sloped at the end thereof facing the other die half 5 and comprises a holder 8 for a septum 2 at this position. In the view in FIG. 1A, a septum 2 has already been placed on said holder 8. The septum 2 at this position comprises a peripheral rim 11 such that the peripheral rim 11 of the septum 2 engages entirely around the holder 8. The die half designed as a male mold 9 is provided with a cap 26 at the end opposite the holder 8, which cap comprises an injection opening via which a plastics material can later be injected into the injection-molding die 3.

The other die half 5 designed as a female mold 10 consists of a base 5a and legs 5b and 5c that are arranged thereon substantially perpendicular to the base 5a. The legs 5b and 5c can be moved radially outwardly relative to the base 5a. Facing inwards and towards the other die half 4 designed as a male mold 9, a stamp 12 is provided on the base 5a, which stamp is surrounded by a peripheral channel 13. The legs 5a and 5b comprise, at the ends thereof facing the base 5a, an undercut 23 which extends entirely around the inner region of the two legs 5b and 5c. Said undercut 23 makes it possible to produce primary packaging of which the outer contour corresponds to that of the conventional glass cartridges, and therefore the consumer does not have to get used to a different design. This undercut 23 makes it necessary, however, for said legs 5b and 5c to be movable radially outwardly relative to the base 6a so that the primary packaging 1 produced by the apparatus according to the invention can be removed from the injection-molding die 3.

In FIG. 1B, the die half 4 designed as a male mold 9 has been inserted into the die half 5 designed as a female mold 10 while forming a cavity 6, the cap 26 of the male mold 9 sealing said cavity from the surroundings. It is now possible to inject a material into the cavity 6 via the injection opening 7. As can also be seen from the view in FIG. 1B, the stamp 12 of the base 5a is pressing against the septum such that said septum is securely pressed against the holder 8 of the die half 4 designed as a male mold 9. It should be noted here that the peripheral rim 13 within the base 5a is in part covered by the septum 2. This makes it possible for the septum 2 to be backmolded in this region.

FIG. 1C shows how the primary packaging 1 is formed after the material has been injected via the injection opening 7 in the injection-molding die 3. It can be clearly seen here that, as a result of the undercut 23, the two die halves 4 and 5 can no longer be simply moved relative to one another in order to remove the primary packaging 1 from the injection-molding die 3. It can also be clearly seen that the peripheral rim 13 of the base 5a is also filled with material and the septum 2 is thus back-molded. After the material has been injected into the cavity 6 and the primary packaging 1 has formed within said cavity 6, a holding pressure or the injection pressure is maintained during a cooling phase until the material of the primary packaging 1 has fallen below its solidification temperature such that the septum 2 cannot become detached from the primary packaging 1 or the position of said septum therein cannot be changed.

Figure 1E:
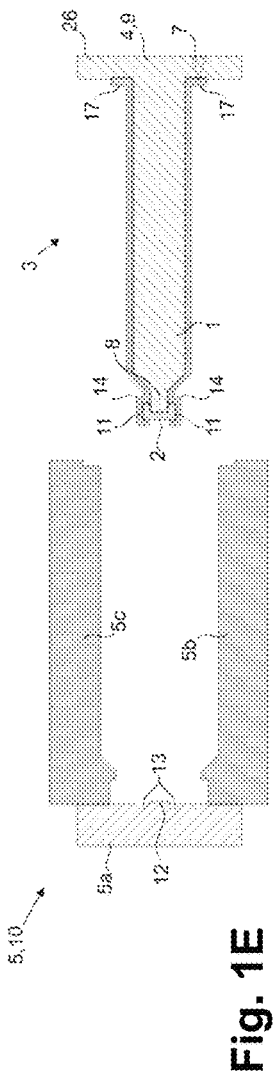

As shown in FIG. 1D, in order to then remove the produced primary packaging 1 from the injection-molding die 3, the two legs 5b and 5c of the die half 5 designed as a female mold 10 are moved radially outwardly relative to the base 5a. As a result, the undercuts 23 release a shoulder 14 of the primary packaging 1 such that the two die halves 4 and 5 can be moved relative to one another such that the die half 4 designed as a male mold 9 is no longer accommodated in the die half 5 accommodated as a female mold 10, as is shown in FIG. 1E.

Figure 1F:
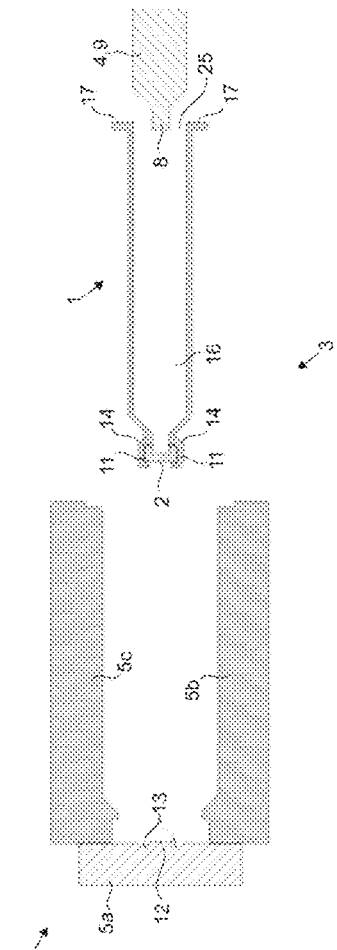

FIG. 1F shows how the produced primary packaging 1 according to the invention is then removed from the die half 4 designed as a male mold 9 and can then be further processed.

Figure 4:
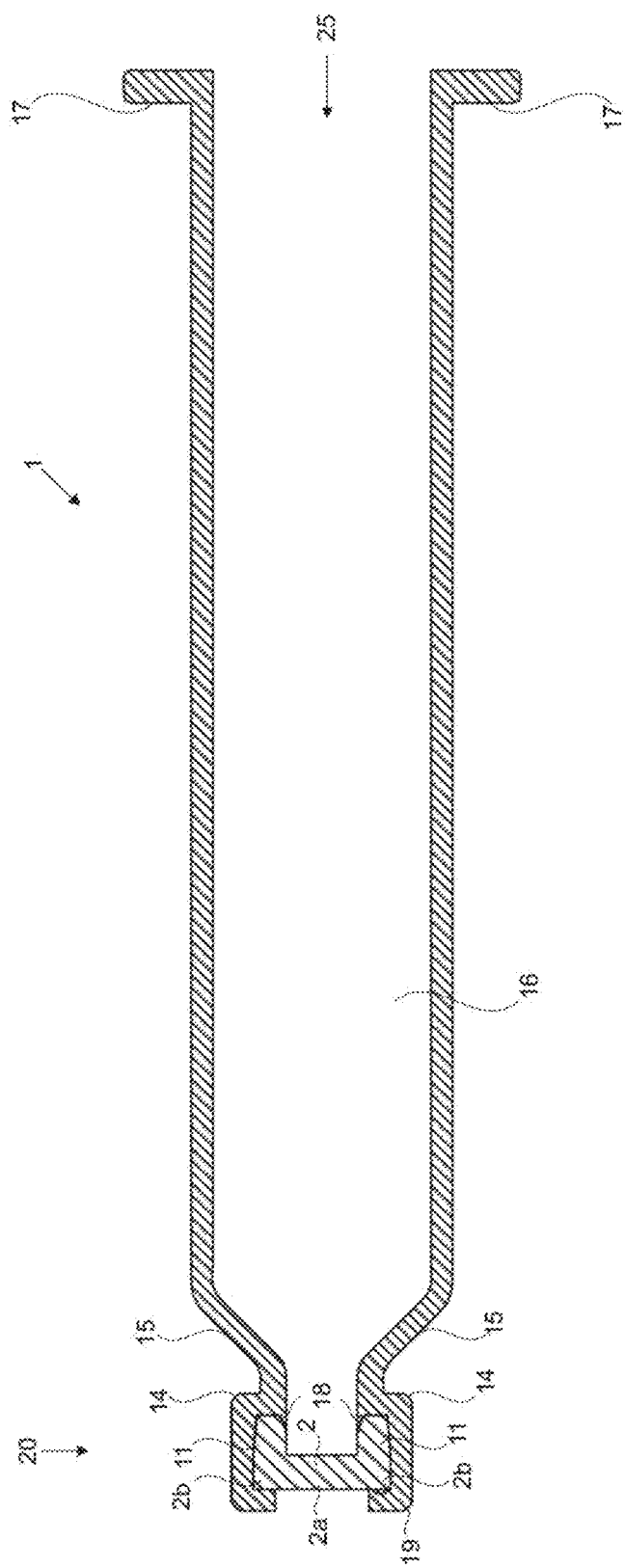
FIG. 4 shows a first embodiment of primary packaging according to the invention.

FIG. 4 shows primary packaging 1 produced according to the method in FIGS. 1A to 1F in the apparatus shown in these drawings. The opposite ends of the primary packaging 1 can be clearly seen here. An opening 25 for introducing a pharmaceutical in a receiving chamber 16 of the primary packaging 1 is provided at one end. A peripheral flange 17 is also arranged at the ends having the opening 25, making it easier to subsequently handle the primary packaging 1 when it is further processed. A removal region 20 for removing a pharmaceutical introduced in the receiving chamber 16 is arranged at the other end of the primary packaging 1. Said removal region 20 contains a septum 2, which is provided with a peripheral rim 11 in the present case. The septum 2 therefore consists of a base 2a and a wall region 2b, which is positioned substantially perpendicularly on the base 2a in the outer region thereof, extends around the base 2a and forms the peripheral rim 11. The septum 2 comprises, on the base 2a thereof, spacers 19 that are used to easily isolate the septa when the primary packaging 1 is produced. The peripheral rim 11 of the septum 2 is formed having a slope 18 in the rim region thereof facing the receiving chamber 16. Said slope is mainly used during production to more easily place the septum 2 on the holder 8 for the septum at that position. The septum 2 has been back-molded in the region of said slopes 18 such that the septum is thus securely held in the primary packaging 1.

At the same time, the base 2a of the septum 2 is also overmolded on the region thereof facing away from the receiving chamber 16 such that the septum 2 is also securely held in the primary packaging 1 in this way, too. Furthermore, the primary packaging 1 tapers in the removal region 20 thereof and is therefore provided with a slope 15. The receiving region 20 also comprises a peripheral shoulder 14. As a result of this embodiment having the slopes 15 and the shoulder 14, the primary packaging 1 has a shape that is substantially identical to that of conventional glass cartridges, and a greater market acceptance by pharmaceutical customers is therefore ensured. Furthermore, on account of the same internal shape of the primary packaging 1, the flow behaviour for the liquid or the pharmaceutical within the receiving chamber 16 is substantially identical to the flow behaviour in the conventional glass cartridges.

FIGS. 2A to 2E show a second embodiment of a method according to the invention for producing primary packaging 101 according to the invention in a second embodiment of an apparatus according to the invention in several method steps.

Figure 2A:
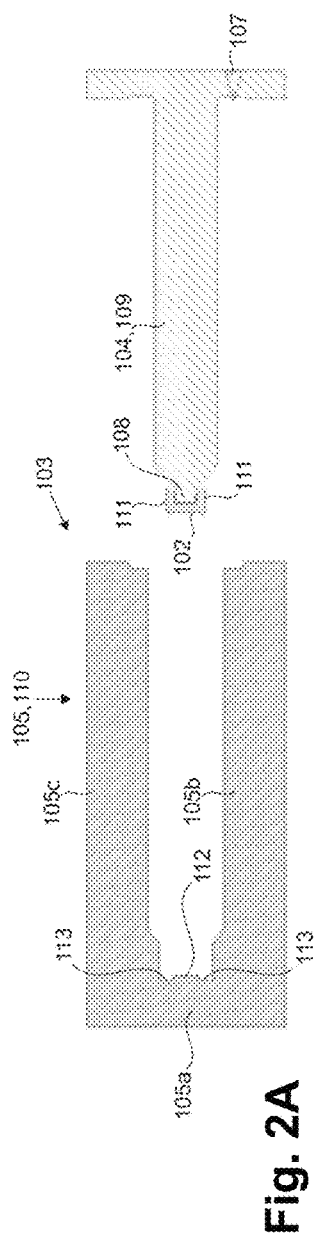

FIG. 2A shows two die halves 104, 1055 of an injection-molding die 103, one die half 104 being designed as a male mold 109 and the other die half 105 being designed as a female mold 110. The die half 104 designed as a male mold 109 is tapered or sloped at the end thereof facing the other die half 105 and comprises a holder 108 for a septum 102 at this position. In the view in FIG. 2A, a septum 102 has already been placed on said holder 108. The septum 102 here comprises a peripheral rim 111 such that the peripheral rim 111 of the septum 102 engages entirely around the holder 108. The die half 104 designed as a male mold 109 is provided with a cap 126 at the end opposite the holder 108, which cap comprises an injection opening 107 via which a plastics material can later be injected into the injection-molding die 103.

The other die half 105 designed as a female mold 110 consists of a base 105a and legs 105b and 105c that are arranged thereon substantially perpendicular to the base 105a. The legs 105b and 105c are stationary in relation to the base 5a. Facing inwards and towards the other die half 104 designed as a male mold 109, a stamp 112 is provided on the base 105a, which stamp is surrounded by a peripheral channel 113.

Figure 2B:
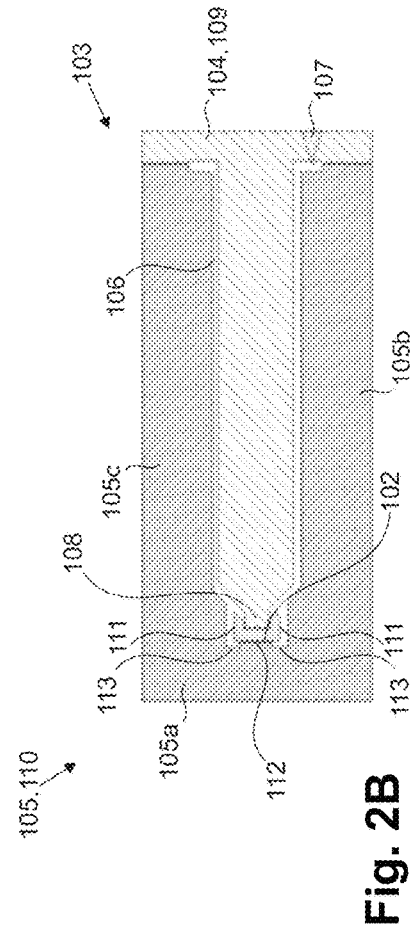

In FIG. 2B, the die half 104 designed as a male mold 109 has been inserted into the die half 105 designed as a female mold 110 while forming a cavity 106, the cap 126 of the male mold 109 sealing said cavity 106 from the surroundings. It is now possible to inject a material into the cavity 106 via the injection opening 107. As can also be seen from the view in FIG. 2B, the stamp 112 of the base 105a is pressing against the septum 102 such that said septum is securely pressed against the holder 108 of the die half 104 designed as a male mold 109. It should be noted here that the peripheral rim 113 within the base 105a is in part covered by the septum 102. This makes it possible for the septum 2 to be back-molded in this region.

Figure 2C:
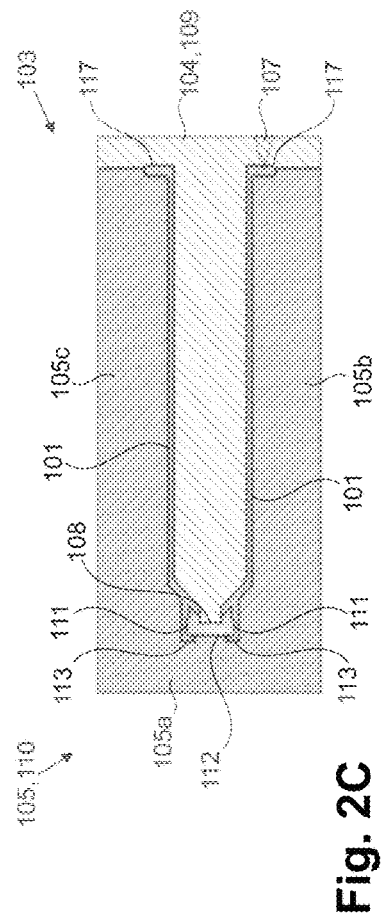

FIG. 2C shows how the primary packaging 1 is formed after the material has been injected via the injection opening 107 in the injection-molding die 103. It can be clearly seen here that, as a result of the lack of undercuts similar to those from the apparatus in FIGS. 1A to 1F, the two die halves 104 and 105 can be easily moved relative to one another in order to remove the primary packaging 101 from the injection-molding die 103. It can also be clearly seen that the peripheral rim 113 of the base 105a is also filled with material and the septum 102 is thus back-molded. After the material has been injected into the cavity 106 and the primary packaging 101 has formed within said cavity 106, a holding pressure or the injection pressure is maintained during a cooling phase until the material of the primary packaging 101 has fallen below its solidification temperature such that the septum 102 cannot become detached from the primary packaging 101 or the position of said septum therein cannot be changed.

As is shown in FIG. 1D, in order to remove the produced primary packaging 101 from the injection-molding die 103, the two die halves 104 and 105 can be moved relative to one another such that the die half 104 designed as a male mold 109 is no longer accommodated in the die half 105 accommodated as a female mold 110, as is shown in FIG. 2D.

FIG. 2E shows how the produced primary packaging 101 according to the invention is then removed from the die half 104 designed as a male mold 109 and can then be further processed.

Figure 5:
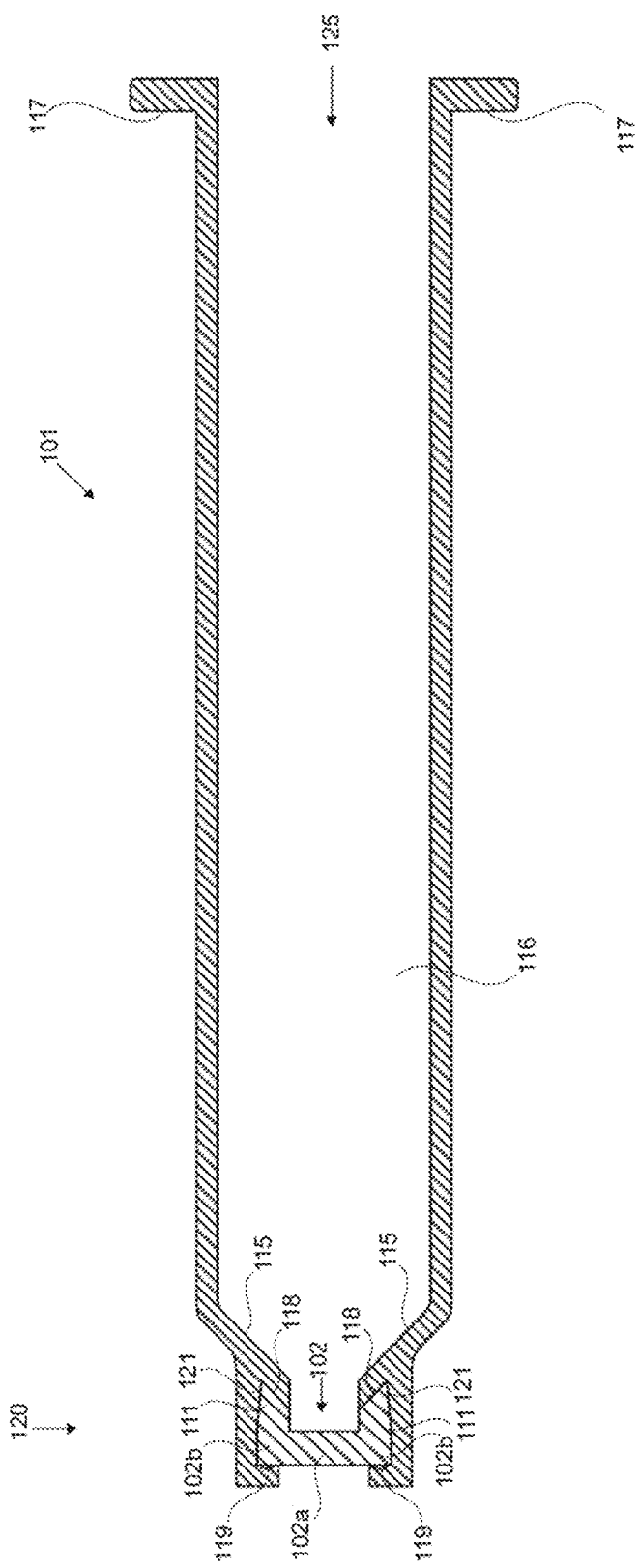
FIG. 5 shows a second embodiment of primary packaging according to the invention.

FIG. 5 shows primary packaging 101 which has been produced according to the methods and by means of the apparatus from FIGS. 2A to 2E. In this case, the inner shape of the primary packaging 101 corresponds to that of the primary packaging 1 from FIG. 4. A peripheral slope 115 is also provided that tapers the primary packaging 101 in the removal region 120. The primary packaging 101 does not, however, comprise a shoulder in said removal region 102 in this case; it is therefore possible to use a simpler production method and a simpler production apparatus. The septum 102 in this region again comprises a base 102a on which a peripheral wall region 102b is arranged that forms a peripheral rim 111. Said septum 102 again also comprises, on the base 102a thereof, spacers 119 that are used to easily isolate the septa when the primary packaging 101 is produced. Said septum 102 likewise also comprises a slope 118; however, in this case, said slope extends from the inner region as far as the outer region of the peripheral rim 111. Said slope 118 is used not only to easily place the septum 102 on the holder 108 when the primary packaging 101 is produced. Rather, on account of a slope 118 of this kind, wall thicknesses are avoided in the neck or the removal region 120 and in the receiving region 116 of the primary packaging 101 such that the flow behaviour of the pharmaceutical is not negatively affected. In this respect, it is also ensured that the inner contour or the inner shape of the primary packaging 101 corresponds to that of the conventional glass cartridges.

FIGS. 3A to 3F show a third embodiment of a method according to the invention for producing primary packaging 201 according to the invention in a third embodiment of an apparatus according to the invention in several method steps.

FIG. 3A shows two die halves 204, 205 of an injection-molding die 203, one die half 204 being designed as a male mold 209 and the other die half 205 being designed as a female mold 210. The die half 204 designed as a male mold 209 is tapered or sloped at the end thereof facing the other die half 205 and comprises a holder 208 for a septum 202 at this position. In the view in FIG. 3A, a septum 202 has already been placed on said holder 208. The septum 202 here comprises a peripheral rim 211 such that the peripheral rim 211 of the septum 202 engages entirely around the holder 208. The die half designed as a male mold 209 is provided with a cap 226 at the end opposite the holder 208, which cap comprises an injection opening 207 via which a plastics material can later be injected into the injection-molding die 203.

The other die half 205 designed as a female mold 210 consists of a base 205a and legs 205b and 205c that are arranged thereon substantially perpendicular to the base 205a. The legs 5b and 5c can be moved radially outwardly relative to the base 5a. Facing inwards and towards the other die half 204 designed as a male mold 209, a stamp 212 is provided on the base 205a, which stamp is surrounded by a peripheral channel 213. The legs 205a and 205b comprise, on the outer periphery thereof, a thread 224 which matches pen injection needles that are common on the market such that it is possible to directly mount cannula/injection needles of this kind in keeping with the conventional glass cartridges.

In FIG. 3B, the die half 204 designed as a male mold 209 has been inserted into the die half 205 designed as a female mold 210 while forming a cavity 206, the cap 226 of the male mold 209 sealing said cavity 206 from the surroundings. It is now possible to inject a material into the cavity 206 via the injection opening 207. As can also be seen from the view in FIG. 3B, the stamp 212 of the base 205a is pressing against the septum 202 such that said septum is securely pressed against the holder 208 of the die half 204 designed as a male mold 209. It can be seen here that the peripheral rim 213 within the base 205a is in part covered by the septum 202. This makes it possible for the septum 202 to be back-molded in this region.

FIG. 3C shows how the primary packaging 201 is formed after the material has been injected via the injection opening 207 in the injection-molding die 2033. It can be clearly seen here that, as a result of the thread 224, the two die halves 204 and 205 can no longer be simply moved relative to one another in order to remove the primary packaging 201 from the injection-molding die 203. It can also be clearly seen that the peripheral rim 213 of the base 205a is also filled with material and the septum 202 is thus back-molded. After the material has been injected into the cavity 206 and the primary packaging 201 has formed within said cavity 206, a holding pressure or the injection pressure is maintained during a cooling phase until the material of the primary packaging 201 has fallen below its solidification temperature such that the septum 202 cannot become detached from the primary packaging 201 or the position of said septum therein cannot be changed.

Figure 3D:
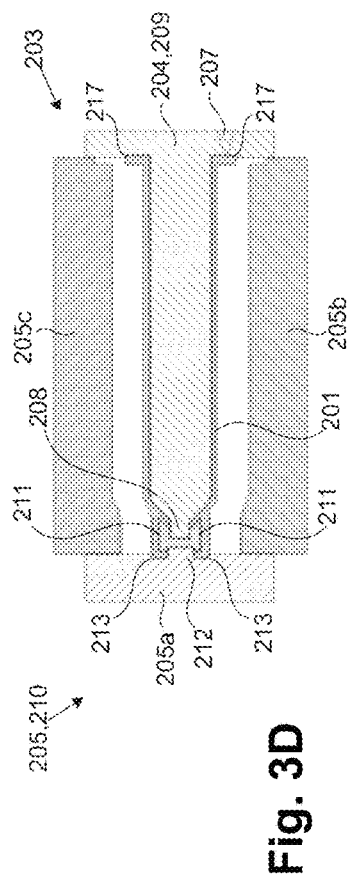
Figure 3E:
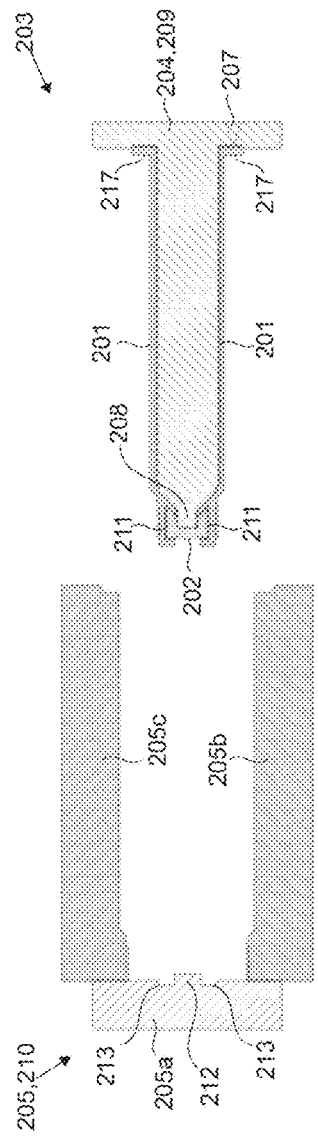

As shown in FIG. 3D, in order to then remove the produced primary packaging 201 from the injection-molding die 203, the two legs 205b and 205c of the die half 205 designed as a female mold 210 are moved radially outwardly relative to the base 205a. As a result, the thread 224 on the primary packaging 201 is released such that the two die halves 204 and 205 can be moved relative to one another such that the die half 204 designed as a male mold 209 is no longer accommodated in the die half 205 accommodated as a female mold 210, as is shown in FIG. 3E.

Figure 3F:
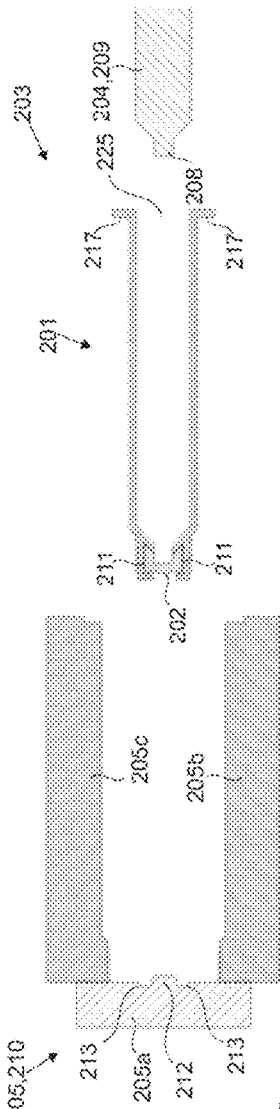

FIG. 3F shows how the produced primary packaging 201 according to the invention is then removed from the die half 204 designed as a male mold 209 and can then be further processed.

Figure 6:
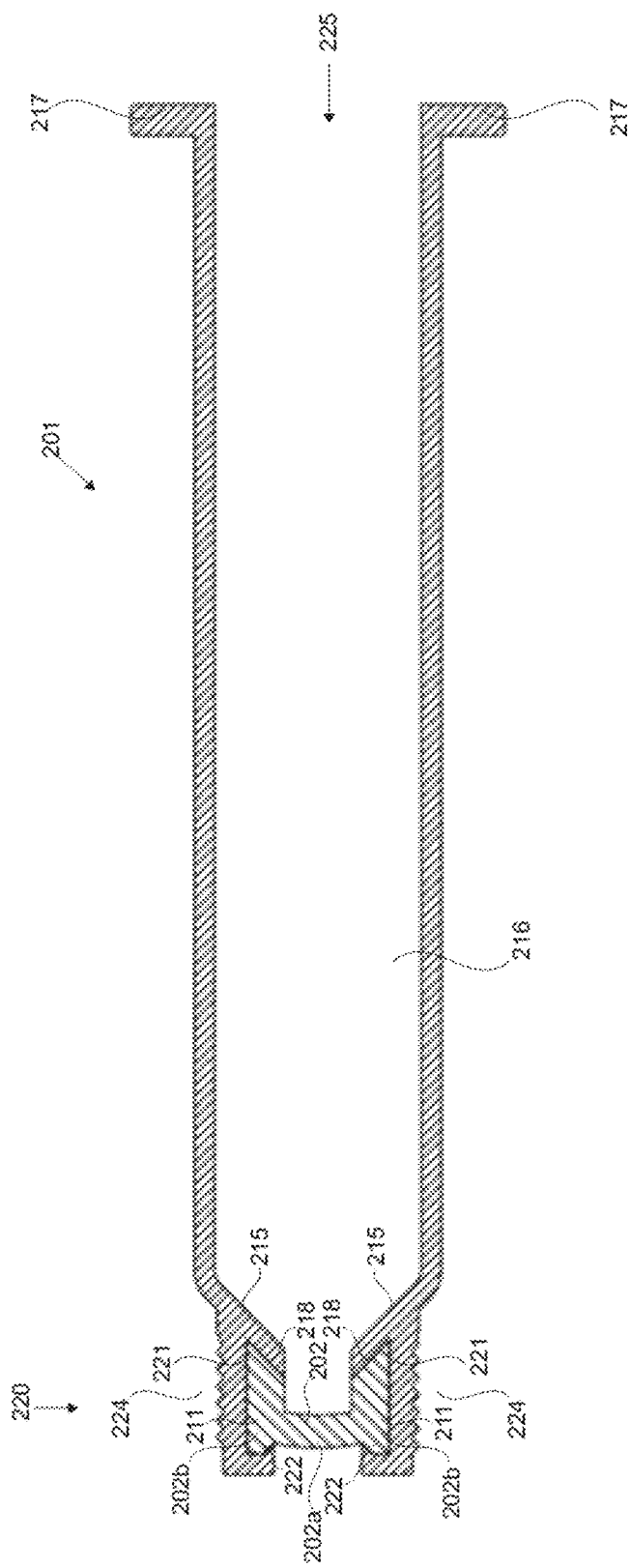
FIG. 6 shows a third embodiment of primary packaging according to the invention.

FIG. 6 shows primary packaging 201 which has been produced according to the method and by means of the apparatus from FIGS. 3A to 3F. Said primary packaging 201 comprises, in the removal region 220 thereof, a thread 224 which matches pen injection needles that are common on the market such that it is possible to directly mount cannula/injection needles of this kind in keeping with the conventional glass cartridges. In this embodiment of primary packaging 201 too, the inner contour again corresponds to the inner contour of the conventional glass cartridges, leading to identical flow behaviour in this case, too. The septum 202 again also consists of a base 202a and a peripheral wall region 202b, which is formed as a peripheral rim 211 and is again also bevelled at the free end thereof by means of slopes 218. Again, said slopes 218 are also used to more easily mount the septum 202 on the holder 208 of the injection-molding die 203. In addition, this again also prevents wall thicknesses within the receiving chamber 216, which thicknesses could negatively affect the flow behaviour of the pharmaceutical or the liquid that is held in the receiving chamber 216.

On its base 202a, the septum 202 comprises a peripheral projection 222, which is back-molded by the material when the primary packaging 201 is produced. As a result of this back-molded portion, improved hold of the septum 202 in the primary packaging 201 is achieved. In addition, this also allows any potential pretension in the septum 202 to be better maintained.

For illustrative purposes, this is shown again in FIGS. 7A to 7C.

As can be clearly seen in FIG. 7A, the base 202a of the septum 202 is curved and is thus pretensioned. In this view, the septum 202 has already been placed on the holder 208 of the die half 204 designed as a male mold 209. The peripheral leg 202b of the septum 202 engages around the holder 208 by means of the peripheral rim 211 of said leg. The peripheral rim 211 of the septum 202 is again provided with a slope 218, which makes it easier to mount the septum 202 on the holder 208 and also prevents wall thicknesses within the receiving chamber 216 of the eventual primary packaging 201.

In the view in FIG. 7B, the die half 204 designed as a male mold 209 has been introduced into the other die half 205 designed as a female mold 210. The stamp 212 of the die half 205 presses the septum 202, on the base 202a thereof, against the holder 208 such that the curve shown clearly in FIG. 7A is no longer present. Furthermore, the peripheral projection 222 on the septum 202 and the channel 213 that extends around the stamp 212 can also be seen here.

FIG. 7C shows the finished primary packaging 201 and the removal region 220 thereof again in detail.

As can be clearly seen here, the base 202a of the septum 202 is again slightly curved such that said base maintains a certain pretension that consistently seals the septum in a reliably sterile manner. Furthermore, it can also be seen in this view that the peripheral projection 222 on the septum 202 has been overmolded with the material and the septum is thus securely accommodated within the primary packaging 201.

Having now fully described the present invention in some detail by way of illustration and examples for purposes of clarity of understanding, it will be obvious to one of ordinary skill in the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims.

When a group of materials, compositions, components or compounds is disclosed herein, it is understood that all individual members of those groups and all subgroups thereof are disclosed separately. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. Additionally, the end points in a given range are to be included within the range. In the disclosure and the claims, "and/or" means additionally or alternatively. Moreover, any use of a term in the singular also encompasses plural forms.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements.

One of ordinary skill in the art will appreciate that starting materials, device elements, analytical methods, mixtures and combinations of components other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. The invention illustratively described herein suitably may be practiced in the absence of any element or elements, limitation or limitations which is not specifically disclosed herein. Headings are used herein for convenience only.

All publications referred to herein are incorporated herein to the extent not inconsistent herewith. Some references provided herein are incorporated by reference to provide details of additional uses of the invention. All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art.

LIST OF REFERENCE NUMERALS 1 primary packaging
2 septum
2a base
2b wall region
3 injection-molding die
4 die half
5 die half
5a base
5b leg
5c leg
6 cavity
7 injection opening
8 holder
9 male mold
10 female mold
11 rim
12 stamp
13 channel
14 shoulder
15 slope
16 receiving chamber
17 flange
18 slope
19 spacer
20 removal region
21 slope
23 undercut
25 opening
26 cap
101 primary packaging
102 septum
102a base
102b wall region
103 injection-molding die
104 die half
105 die half
105a base
105b leg
105c leg
106 cavity
107 injection opening
108 holder
109 male mold
110 female mold
111 rim
112 stamp
113 channel
114 shoulder
115 slope
116 receiving chamber
117 flange
118 slope
119 spacer
120 removal region
121 slope
125 opening
126 cap
201 primary packaging
202 septum
202a base
202b wall region
203 injection-molding die
204 die half
205 die half
205a base
205b leg
205c leg
206 cavity
207 injection opening
208 holder
209 male mold
210 female mold
211 rim
212 stamp
213 channel
214 shoulder
215 slope
216 receiving chamber
217 flange
218 slope
219 spacer
220 removal region
221 slope
222 projection
224 thread
225 opening
226 cap

The invention claimed is:

1. A method for producing primary packaging having an integrated septum comprising the steps of:
   a) providing a septum,
   b) providing an injection-molding die having two die halves able to be moved relative to one another, wherein one die half comprises a holder for the septum, and the other comprises a stamp,
   c) positioning the septum in the injection-molding die,
   d) moving the two die halves of the injection-molding die such that a cavity is formed that corresponds to the shape of the primary packaging to be produced,
   e) injecting a material into the cavity in the injection-molding die via an injection opening in one of the die halves of the injection-molding die, the two die halves of the injection-molding die pretensioningly holding the septum therebetween, and a rim of the septum being overmolded by the material, a region of the septum in contact with the two die halves remaining free of material, wherein the septum is at least partially arranged between the stamp and the holder, and the stamp and the holder are pressed against the septum when the material is injected via an injection opening such that the septum is in a pretensioned state, wherein the septum is also overmolded with material from the front thereof and only the region of the septum in which the stamp and the holder press against one another remains free of the material, f) cooling the injected material while maintaining a holding pressure, as a result of which the primary packaging is formed having an integrated septum, g) moving the two die halves of the injection-molding die such that the produced primary packaging having the integrated septum is removable from the injection-molding die, and h) removing the produced primary packaging having the integrated septum from the injection-molding die.

2. The method according to claim 1, wherein a plastics material is used as the material.

3. The method according to claim 1, wherein the septum is made of an elastomer.

4. The method according to claim 1, wherein before the material is injected, the septum is positioned in a holder of a die half designed as a male mold comprising a protrusion which corresponds to an inner contour of the primary packaging to be produced.

5. The method according to claim 1, wherein before the material is injected, the septum is positioned in a holder of a die half designed as a female mold comprising a base and two legs positioned substantially perpendicular to the base, wherein an inner contour of the two legs corresponds to an outer contour of the primary packaging to be produced.

6. The method according to claim 1, wherein a peripheral rim of the septum is overmolded when the material is injected.

7. An apparatus for producing primary packaging having comprising an integrated septum according to the method of claim 1,
wherein an injection-molding die is provided with two die halves able to be moved relative to one another, one of the die halves being designed as a male mold comprising a protrusion which corresponds to an inner contour of the primary packaging to be produced, and the other die half being designed as a female mold, comprising a base and two legs positioned substantially perpendicular to the base, wherein an inner contour of the two legs correspond to an outer contour of the primary packaging to be produced, wherein a holder for the septum being provided on one of the die halves and a stamp being provided on the other die half for pressing the septum against the holder when the material is injected via an injection opening into a cavity, wherein the septum is at least partially arrangeable between the stamp and the holder, and the stamp and the holder are pressed against the septum when the material is injected via an injection opening such that septum is in a pretensioned state, and wherein the septum is also overmolded with material from the front thereof and only a region of the septum in which the stamp and the holder press against one another remains free of the material.

8. The apparatus according to claim 7, wherein it being possible to move the legs outwardly away.

* * * * *